(12) United States Patent
Saita (10) Patent No.: US 8,818,184 B2
(45) Date of Patent: Aug. 26, 2014

(54) LENS DEVICE, CAMERA SYSTEM, AND EXPOSURE CONTROL METHOD

(71) Applicant: FUJIFILM Corporation, Tokyo (JP)

(72) Inventor: Arihiro Saita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/193,948

(22) Filed: Feb. 28, 2014

(65) Prior Publication Data

US 2014/0178061 A1 Jun. 26, 2014

Related U.S. Application Data

(63) Continuation of application No. PCT/JP2012/068598, filed on Jul. 23, 2012.

(30) Foreign Application Priority Data

Aug. 31, 2011 (JP) ................. 2011-189790

(51) Int. Cl.
 *G03B 7/00* (2014.01)
 *H04N 5/238* (2006.01)

(52) U.S. Cl.
 USPC ............. 396/213; 396/241; 348/363

(58) Field of Classification Search
 USPC ............ 396/213, 227, 241; 348/362–364
 See application file for complete search history.

(56) References Cited

U.S. PATENT DOCUMENTS

| 6,639,629 B1* | 10/2003 | Takayama et al. ............ 348/364 |
| 7,936,989 B2 | 5/2011 | Shinohara |
| 2007/0065135 A1 | 3/2007 | Takei et al. |
| 2007/0086772 A1 | 4/2007 | Shinohara |

FOREIGN PATENT DOCUMENTS

| JP | 06-022208 | 1/1994 |
| JP | 06-165025 | 6/1994 |
| JP | 11-008803 | 1/1999 |
| JP | 2000-010150 | 1/2000 |
| JP | 2004-198828 | 7/2004 |
| JP | 2006-106511 | 4/2006 |
| JP | 2007-025432 | 2/2007 |
| JP | 2007-114283 | 5/2007 |

OTHER PUBLICATIONS

International Search Report, PCT/JP2012/068598, Oct. 16, 2012.

* cited by examiner

*Primary Examiner* — WB Perkey
*Assistant Examiner* — Minh Phan
(74) *Attorney, Agent, or Firm* — Young & Thompson (57) ABSTRACT

When a exposure controlling unit changes an aperture value of a diaphragm in a predetermined range, the exposure controlling unit also changes a transmittance of a variable ND filter so as to perform an exposure control and, after obtaining a proper exposure by changing both the aperture value and the transmittance, sets the aperture value after exposure control to Fa, and in a case where the aperture value at which a maximum resolving power is obtained is set to Fb, when a condition, Fa≠Fb, is satisfied and the transmittance is neither the minimum nor the maximum, the exposure controlling unit brings the aperture value close to Fb and changes the transmittance so as to maintain the proper exposure after the exposure control.

5 Claims, 5 Drawing Sheets

LENS DEVICE, CAMERA SYSTEM, AND EXPOSURE CONTROL METHOD

CROSS REFERENCE TO RELATED APPLICATION

This is a continuation of International Application No. PCT/JP2012/068598, filed on Jul. 23, 2012, and claims priority from Japanese Patent Application No. 2011-189790, filed on Aug. 31, 2011, the entire disclosures of which are incorporated herein by reference.

TECHNICAL FIELD

The present invention relates to a lens device, a camera system, and an exposure control method.

BACKGROUND ART

It is known to jointly use a mechanical diaphragm and a variable ND filter which electrically changes a light transmittance as light quantity adjusting means in an image capturing device such as a video camera or a digital still camera that uses an image capturing element (see Patent Literatures 1 to 3).

In Patent Literature 1, it is disclosed to perform an exposure control in such a manner that, up to a first level of a brightness of a photographic subject, a light quantity is adjusted using a diaphragm while fixing the transmittance of the variable ND filter, when the brightness of the photographic subject is between the first level and a second level, the light quantity is adjusted jointly using the diaphragm and the ND filter, and after the brightness of the photographic subject exceeds the second level, the light quantity is adjusted using the diaphragm while fixing the transmittance of the variable ND filter. With this exposure control, a smooth exposure control with good responsiveness may be achieved or unnatural variation in image quality may be prevented.

CITATION LIST

Patent Literature
Patent Literature 1: JP-A-6-22208
Patent Literature 2: JP-A-2007-25432

SUMMARY OF INVENTION

Technical Problem

A state of a diaphragm mounted in an image capturing device affects a resolving power of a lens. For example, when the diaphragm is opened to capture an image, the resolving power of the lens is deteriorated and when the diaphragm is narrowed to a certain degree from a diaphragm opening, the resolving power of the lens is improved. After exceeding an aperture value at which the resolving power is the highest, the resolving power is deteriorated as the diaphragm is narrowed to the minimum aperture side.

In Patent literature 1, it is disclosed to perform an exposure control is performed by jointly using the variable ND filter and the diaphragm so as to suppress a diaphragm from becoming a small aperture. However, in such an exposure control, the diaphragm value varies in proportion to the brightness of the photographic subject during a period of jointly using the variable ND filter and the diaphragm. Therefore, for a bright photographic subject or a dark photographic subject, the state of the diaphragm is away from a state where the resolving power is the most excellent and thus, the deterioration of the resolving power may not be suppressed.

The present invention has been made in consideration of the above-mentioned problems and an object of the present invention is to provide a lens device capable of performing an exposure control which may suppress a resolving power of a lens from being deteriorated, a camera system including the same, and an exposure control method.

Solution to Problem

A lens device of the present invention includes: a diaphragm having an aperture value which is controlled to control a transmitted light quantity; an optical element having a light transmittance which is electrically controlled; and an exposure controlling unit which controls the aperture value of the diaphragm and the transmittance of the optical element in accordance with a brightness of a photographic subject to perform an exposure control, in which the exposure controlling unit changes at least one of the aperture value and the transmittance to set an exposure value which is included in a range of exposure value from a first exposure value which is determined by a combination of a minimum value of the aperture value in a range of aperture value including an aperture value at which a maximum resolving power is obtained and a maximum value of the transmittance to a second exposure value which is determined by a combination of a maximum value of the aperture value in the range of aperture value and a minimum value of the transmittance, and when the aperture value at the exposure value is different from the aperture value at which the maximum resolving power is obtained and the transmittance at the exposure value is neither the minimum nor the maximum after setting the exposure value, the exposure controlling unit further performs a control to bring the aperture value at the exposure value close to the aperture value at which the maximum resolving power is obtained and change the transmittance at the exposure value so as to maintain the exposure value.

A camera system of the present invention, includes: the lens device; and a camera device which includes an image capturing element which receives light which passes through the lens device.

An exposure control method of a lens device of the present invention which includes a diaphragm having an aperture value which is controlled to control a transmitted light quantity; an optical element having a light transmittance which is electrically controlled, the method includes: an exposure control step of controlling the aperture value of the diaphragm and the transmittance of the optical element in accordance with a brightness of a photographic subject to control exposure, in which the exposure controlling step, at least one of the aperture value and the transmittance is changed to set an exposure value which is included in a range of exposure value from a first exposure value which is determined by a combination of a minimum value of the aperture value in a range of aperture value including an aperture value at which a maximum resolving power is obtained and a maximum value of the transmittance to a second exposure value which is determined by a combination of a maximum value of the aperture value in the range of aperture value and a minimum value of the transmittance, and when the aperture value at the exposure value is different from the aperture value at which the maximum resolving power is obtained and the transmittance at the exposure value is neither the minimum nor the maximum after setting the exposure value, a control is further performed to bring the aperture value at the exposure value close to the aperture value at which the maximum resolving power is obtained and change the transmittance at the exposure value so as to maintain the exposure value.

Advantageous Effects of Invention

According to the present invention, a lens device capable of performing an exposure control which may suppress a resolving power of a lens from being deteriorated, an image capturing device including the same, and an exposure control method may be provided.

DESCRIPTION OF EMBODIMENTS

Hereinafter, embodiments of the present invention will be described with reference to the drawings.

Figure 1:
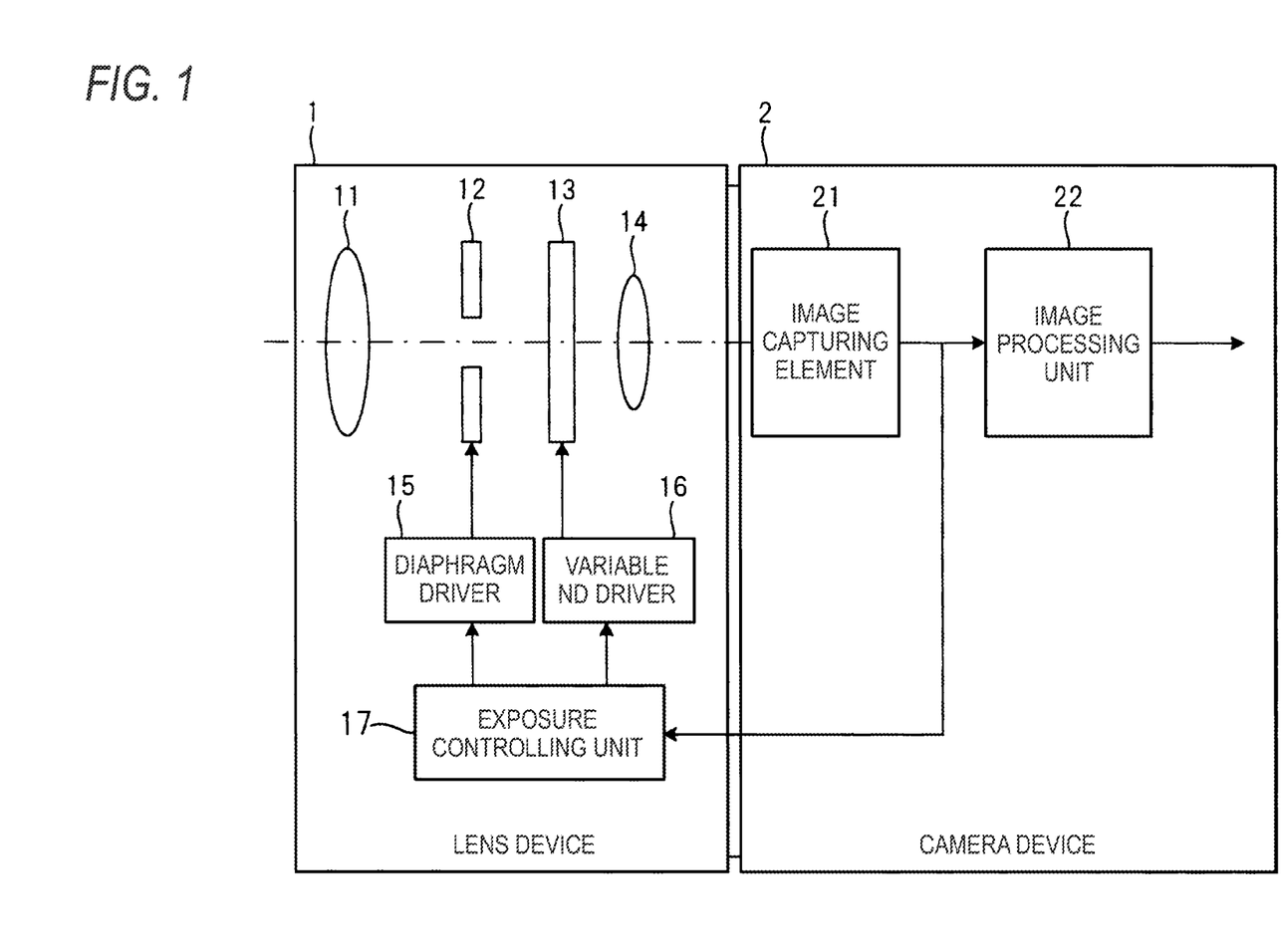
FIG. 1 is a view illustrating a schematic configuration of a camera system for describing an embodiment of the present invention.

FIG. 1 is a view illustrating a schematic configuration of a camera system for explaining an embodiment of the present invention. The camera system is suitable for a TV camera system for business purpose.

The camera system illustrated in FIG. 1 includes a lens device 1 and a camera device 2 equipped with the lens device 1.

The camera device 2 includes an image capturing element 21 which is disposed on an optical axis of the lens device 1 and an image processing unit 22 which processes an image capturing signal obtained by capturing an image using the image capturing element 21 so as to generate captured image data.

An image capturing optical system of the lens device 1 includes a lens group 11 which includes a focus lens group and a zoom lens group, a mechanical diaphragm 12 which changes an opening area so as to adjust a transmitted light quantity, a variable ND filter 13 which is formed of, for example, an electro chromic element (EC element) or a liquid crystal element which is an optical element capable of electrically controlling a light transmittance, and a master lens group 14. The lens group 11, the diaphragm 12, the variable ND filter 13, and the master lens group 14 are arranged in this order from the photographic subject in parallel to each other in the direction of the direction of the optical axis.

The lens device 1 further includes a diaphragm driver 15 which controls the opening/closing of the diaphragm 12, a variable ND driver 16 which controls a light transmittance of the variable ND filter 13, and an exposure controlling unit 17 which changes the aperture value (F number) of the diaphragm 12 and the light transmittance (hereinafter, referred to as a "variable ND transmittance") of the variable ND filter 13 in accordance with the brightness of the photographic subject so as to perform an exposure control.

The exposure controlling unit 17 obtains an image capturing signal output from the image capturing element 21 of the camera device 2 and detects a change in the brightness of the photographic subject based on the image capturing signal.

When the brightness of the photographic subject is changed, the exposure controlling unit 17 transmits a driving signal to at least one of the diaphragm driver 15 and the variable ND driver 16 and changes at least one of the aperture value of the diaphragm 12 and the variable ND transmittance so as to obtain a predetermined exposure (proper exposure set for the brightness in advance) (hereinafter, referred to as a "proper exposure") for a photographic subject with the brightness.

The exposure controlling unit 17 performs an exposure control in accordance with a program diagram which will be described below.

Figure 2:
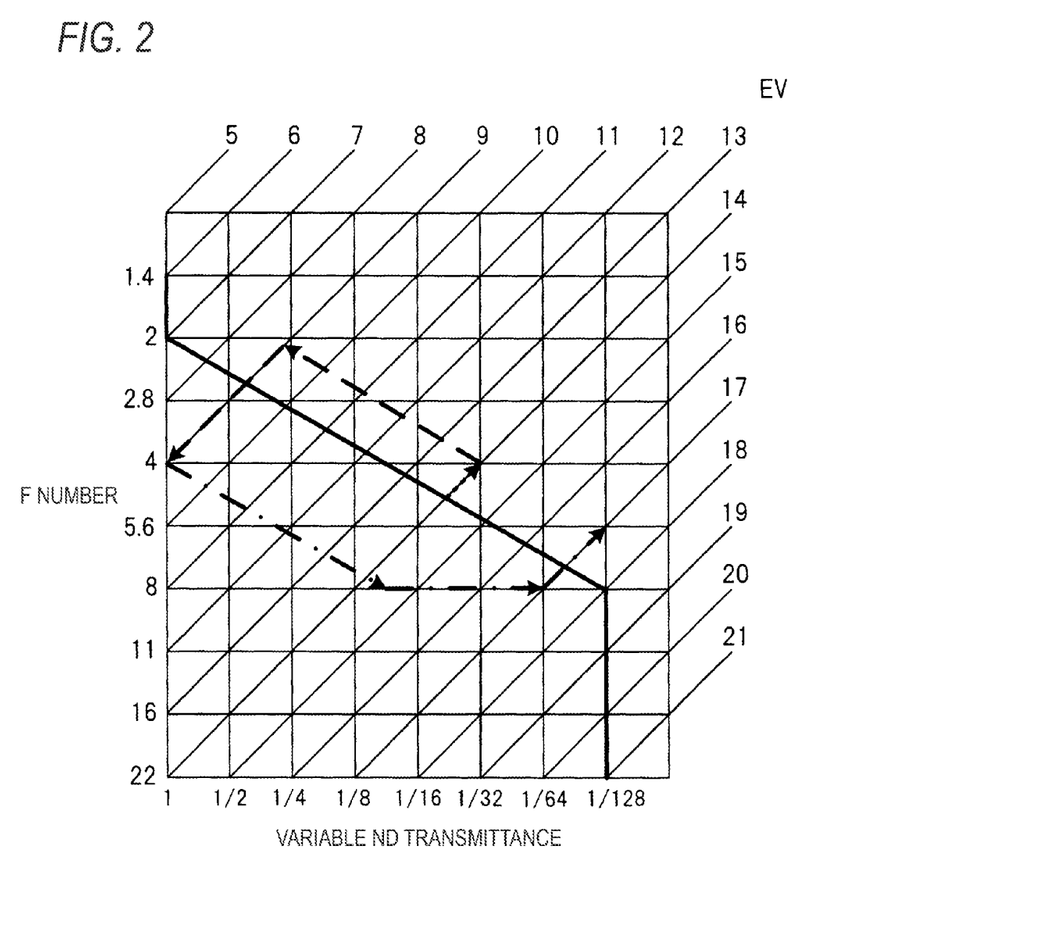
FIG. 2 is a view illustrating an example of a program diagram for exposure control.

FIG. 2 is a view illustrating an example of a program diagram for an exposure control. In FIG. 2, the vertical axis represents an F number of the diaphragm 12 and the horizontal axis represents a variable ND transmittance. In the variable ND transmittance, a state in which the light is best transmitted is represented as transmittance=1. In FIG. 2, a slanting line indicates an exposure value (EV). The EV corresponds to the brightness of the photographic subject and it is shown that the larger the EV, the brighter the photographic subject.

The exposure controlling unit 17 performs an exposure control along the thick solid line illustrated in FIG. 2. That is, up to EV7, the exposure controlling unit 17 changes only the F number of the diaphragm 12 while maintaining the variable ND transmittance at the maximum so as to control the exposure. After exceeding EV7, the exposure controlling unit 17 changes both the F number and the variable ND transmittance along the thick solid line of FIG. 2 so as to control the exposure. Further, after exceeding E18, the exposure controlling unit 17 changes only the F number of the diaphragm 12 while maintaining the variable ND transmittance at the minimum so as to control the exposure.

Exposure control methods by the exposure controlling unit 17 involve a first method and a second method. The first method is a method that changes the EV until the proper exposure is obtained without determining a target EV in advance. The second method is a method that determines in advance the EV at which the proper exposure may be obtained based on the image captured signal and changes the F number and the variable ND transmittance so as to reach the EV within the shortest time. The program diagram of FIG. 2 illustrates a program diagram used for the first method.

The lens device 1 may obtain a good resolving power when the F number is in the range of 2 to 8 and may obtain the maximum resolving power when the F number is 4. Accordingly, in order to improve image quality, it is desirable to capture an image in the state where the F number is 4, if possible. However, for example, when the exposure is controlled by changing only the variable ND transmittance while fixing the F number at 4, it may take a long time until the EV reaches a target value.

For example, in a case where the proper exposure may be obtained at EV14 by increasing the EV from EV6, the proper exposure may be obtained while obtaining the maximum resolving power when employing a method in which the variable ND transmittance is fixed and the F number is changed from 1.4 to 4, and then the F number is fixed and the variable ND transmittance is changed from 1 to 1/32. Whereas, in order to make a change from EV6 to EV14 following the thick solid line of FIG. 2, the F number is changed to a value between 4 and 5.6 and the variable ND transmittance is changed to a value between 1/16 and 1/32, which may narrow the range of changed variable ND transmittance as compared with a case in which the F number is fixed at 4, thereby shortening the time until obtaining the proper exposure.

In this case, even though the F number is out of 4, a good resolving power may be obtained when the F number is in the range of 2 to 8 as described above. Thus, the influence on the image quality becomes restrictive. Therefore, the exposure controlling unit 17 shortens the time until obtaining the proper exposure while maintaining the good resolving power by changing both the F number and the variable ND transmittance within a range of the EV from EV7 which is determined by a combination of the minimum F number (F2) within the range of F number from 2 to 8 and the maximum value (=1) of the variable ND transmittance to EV18 which is determined by a combination of the maximum F number (F8) within the range of F number from 2 to 8 and the minimum value (=$\frac{1}{128}$) of the variable ND transmittance. Here, although the range of F number at which the good resolving power may be obtained is set as F2 to F8, this is an example. A range where the good resolving power may be obtained including the F number at which the maximum resolving power may be obtained (for example, a range where both ends have one or two F numbers before and after the maximum resolving power, respectively) may be optionally set. A range where the good resolving power may be obtained may be determined in advance by capturing a test image while changing the F number prior to shipping the lens device 1.

When the F number (referred to as Fa) at the time when the proper exposure is obtained is not the F number (here, F4) at which the maximum resolving power may be obtained and the variable ND transmittance is neither the minimum nor the maximum after obtaining the proper exposure by changing both the F number and the variable ND transmittance, the exposure controlling unit 17 bring the F number close to F4 and changes the variable ND transmittance so as to maintain the proper exposure.

For example, descriptions will be made on a case in which the brightness of the photographic subject become bright from a state where the F number and the variable ND transmittance are at the intersecting point of the sloping line of EV8 and the thick solid line in FIG. 2. When the proper exposure is obtained at the time of raising the EV from EV8 to EV14, Fa≠F4 and the variable ND transmittance is neither the maximum nor the minimum. Thus, the exposure controlling unit 17 brings the F number to 4 and the variable ND transmittance to $\frac{1}{32}$ while maintaining EV14 as illustrated by the broken line arrow in FIG. 2.

In this case, the exposure controlling unit 17 supplies a driving signal, which opens the diaphragm 12 at a speed matched to a speed at which the variable ND transmittance is changed to $\frac{1}{32}$, to the diaphragm driver 15 and the variable ND driver 16. Therefore, the F number is changed to 4 while the EV is maintained at 14 and thus, the maximum resolving power may be obtained while maintaining the proper exposure.

When the brightness of the photographic subject becomes dark in a state where the F number is 4 and the variable ND transmittance is $\frac{1}{32}$, the exposure controlling unit 17 changes both the F number and the variable ND transmittance along the broken line arrow which is diagonally directed to the upper left side in FIG. 2 so as to lower the EV. Further, when the proper exposure is obtained at the time when the EV becomes EV9, the exposure controlling unit 17 makes the F number 4 and the variable ND transmittance 1 while maintaining EV9 as illustrated by the broken line arrow which is diagonally directed to the lower left of FIG. 2.

When the brightness of the photographic subject becomes bright in a state where the F number is 4 and the variable ND transmittance is 1, the exposure controlling unit 17 changes both the F number and the variable ND transmittance along the one dot chain line arrow which is diagonally directed to the lower right side of FIG. 2 so as to increase the EV. When the F number is 8, the exposure controlling unit 17 does not change the F number anymore and lowers only the variable ND transmittance (see the one dot-chain line arrow which is directed to the right side in FIG. 2). When the proper exposure is obtained at the time when the EV becomes EV17, the exposure controlling unit 17 brings the F number to F5.6 being close to F4 and sets the variable ND transmittance to $\frac{1}{128}$ while maintaining EV17 as illustrated by the one-dot chain line arrow which is diagonally directed to the upper right side in FIG. 2).

As described above, when the F number is not a value at which the maximum resolving power may be obtained and the variable ND transmittance is neither the minimum nor the maximum after obtaining the proper exposure, the exposure controlling unit 17 performs a control to bring the F number close to a value at which the maximum resolving power may be obtained. By the control, in the range of EV7 to EV18, the resolving power may always be brought close to the high resolving power, thereby enabling the image to be captured with a high quality. Further, after obtaining the proper exposure, the F number and the variable ND transmittance are changed while maintaining the proper exposure. Therefore, only the resolving power is improved without changing the exposure, and thus, the high image quality may be attained without any sense of incompatibility.

When the exposure controlling unit 17 controls the exposure by the second method (a method that determines a target EV and changes the F number and the variable ND transmittance so as to reach the target EV within the shortest time), the proper exposure may be obtained within the shortest time and thus, the exposure may be controlled with high responsiveness. After obtaining the proper exposure, the control is performed to increase the resolving power while maintaining the proper exposure. Therefore, both the improvement of responsiveness and the improvement of resolving power may be achieved.

Hereinafter, an operation at the time of performing an exposure control of a camera system will be described with reference to a flowchart.

Figure 3:
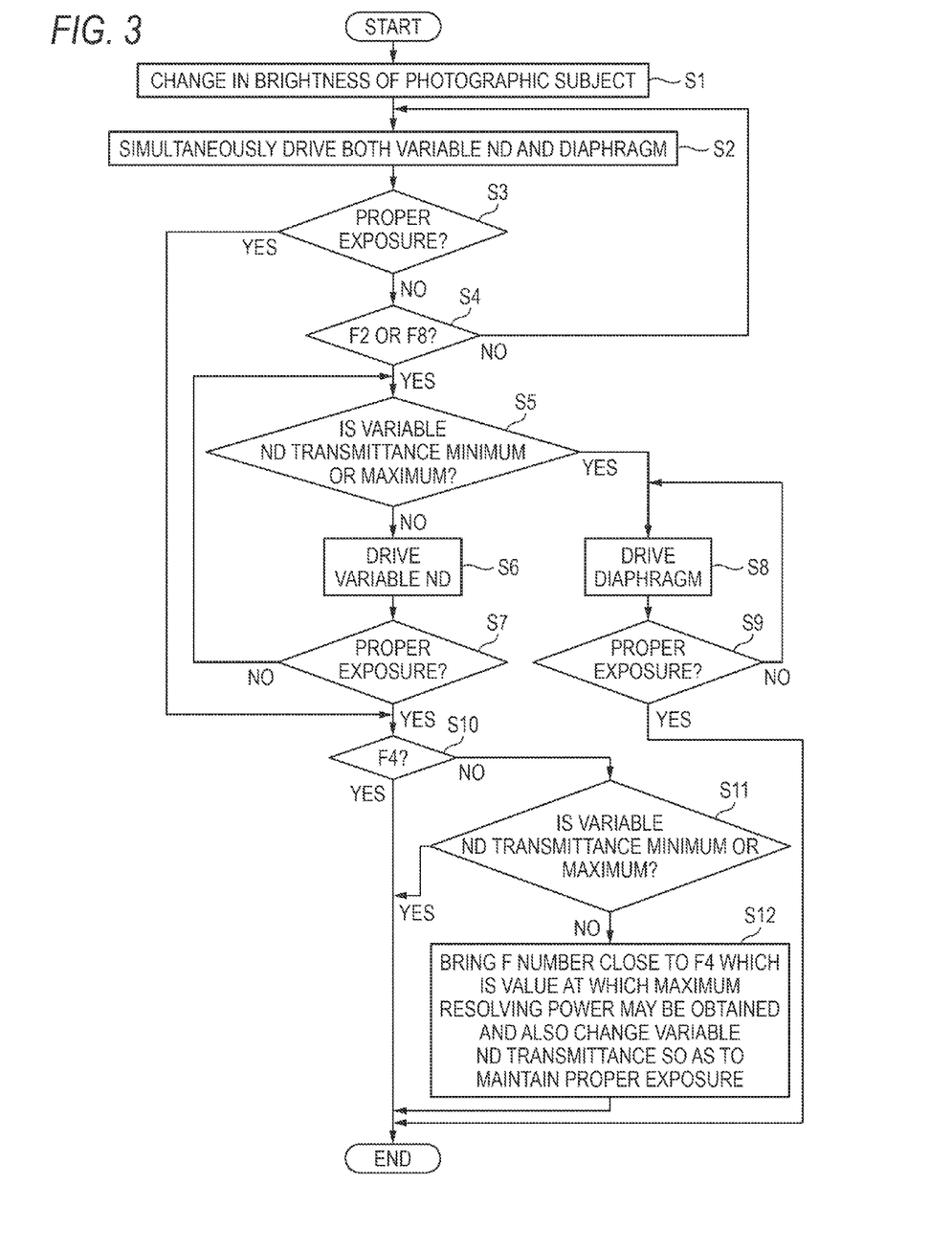
FIG. 3 is a flowchart for describing an operation at the time of exposure control of the camera system illustrated in FIG. 1.

FIG. 3 is a flowchart illustrating an operation at the time of performing an exposure control of the camera system illustrated in FIG. 1. FIG. 3 illustrates that a brightness of the photographic subject is changed when EV is between 7 and 18.

When the brightness of the photographic subject is changed (step S1), the exposure controlling unit 17 outputs a driving signal for changing each of the F number and the variable ND transmittance by a predetermined value to the diaphragm driver 15 and the variable ND driver 16. Then, both the diaphragm 12 and the variable ND filter 13 are driven based on the driving signal so that the EV is changed to a bright direction or a dark direction (step S2).

Next, the exposure controlling unit 17 determines whether the proper exposure is obtained or not based on the image capturing signal output from the image capturing element 21 (step S3). When the proper exposure is obtained (YES in step S3), the exposure controlling unit 17 performs a processing of step S10.

When the proper exposure is not obtained (NO in step S3), the exposure controlling unit 17 determines whether the current F number is F2 or F8 (step S4). When the current F number is neither F2 nor F8 (NO in step S4), there is still a margin to change the F number. Therefore, the exposure controlling unit 17 returns the processing back to step S2 to as to change each of the F number and the variable ND transmittance by a predetermined value so as to change the EV.

When the current F number is F2 or F8 (YES in step S4), the exposure controlling unit 17 determines whether the current variable ND transmittance is the minimum or the maximum (step S5).

When the variable ND transmittance is neither the minimum nor the maximum (NO in step S5), the exposure controlling unit 17 outputs a driving signal for changing the variable ND transmittance by a predetermined value to the variable ND driver 16. Then, the variable ND filter 13 is driven based on the driving signal so that the EV is changed to a bright direction or a dark direction (step S6).

After step S6, the exposure controlling unit 17 determines whether the proper exposure is obtained or not based on the image capturing signal output from the image capturing element 21 (step S7). When the proper exposure is not obtained (NO in step S7), the exposure controlling unit 17 performs a processing of step S5. When the proper exposure is obtained (YES in step S7), the exposure controlling unit 17 performs the processing of step S10.

In the determination of step S5, when the variable ND transmittance is the minimum or the maximum (YES in step S5), the exposure controlling unit 17 outputs a driving signal for changing the F number by a predetermined value to the diaphragm driver 15. Then, the diaphragm 12 is driven based on the driving signal so that the EV is changed to a bright direction or a dark direction (step S8).

After step S8, the exposure controlling unit 17 determines whether the proper exposure is obtained or not based on the image capturing signal output from the image capturing element 21 (step S9). When the proper exposure is not obtained (NO in step S9), the exposure controlling unit 17 performs the processing of step S8. When the proper exposure is obtained (YES in step S9), the exposure controlling unit 17 ends the processing.

In step S10, the exposure controlling unit 17 determines whether the current F number is F4 or not. When it is determined that the current F number is F4 (YES in step S10), the exposure controlling unit 17 ends the processing.

Meanwhile, when the current F number is not F4 (NO in step S10), the exposure controlling unit 17 determines whether the current variable ND transmittance is the minimum or the maximum in step S11. When the current variable ND transmittance is the minimum or the maximum (YES in step S11), the exposure controlling unit 17 ends the processings. In contrast, when the current variable ND transmittance is neither the minimum nor the maximum (NO in step S11), the exposure controlling unit 17 brings the F number close to F4 which is a value at which the maximum resolving power may be obtained and changes the variable ND transmittance so as to maintain the proper exposure (step S12). After step S12, the exposure controlling unit 17 ends the processing.

As described above, the lens device 1 may obtain the proper exposure in a state in which the variable ND transmittance is neither the minimum nor the maximum. When the F number is not a value at which the maximum resolving power may be obtained, the lens device 1 brings the F number close to a value at which the maximum resolving power may be obtained and changes the variable ND transmittance so as to maintain the proper exposure. Therefore, the resolving power may be improved and when the diaphragm and the variable ND filter are jointly used to control the exposure, the high responsiveness and high image quality image may be attained.

In the above description, a range of the F number at which a good resolving power may be obtained is referred to as a predetermined fixed range of F2 to F8. However, an optimal range of F number for the resolving power may vary depending on preference of a photographer or a type of a photographic subject. Therefore, the range of F number at the time of controlling the exposure by changing both the aperture value and the variable ND transmittance may be manually set by the photographer.

Figure 4:
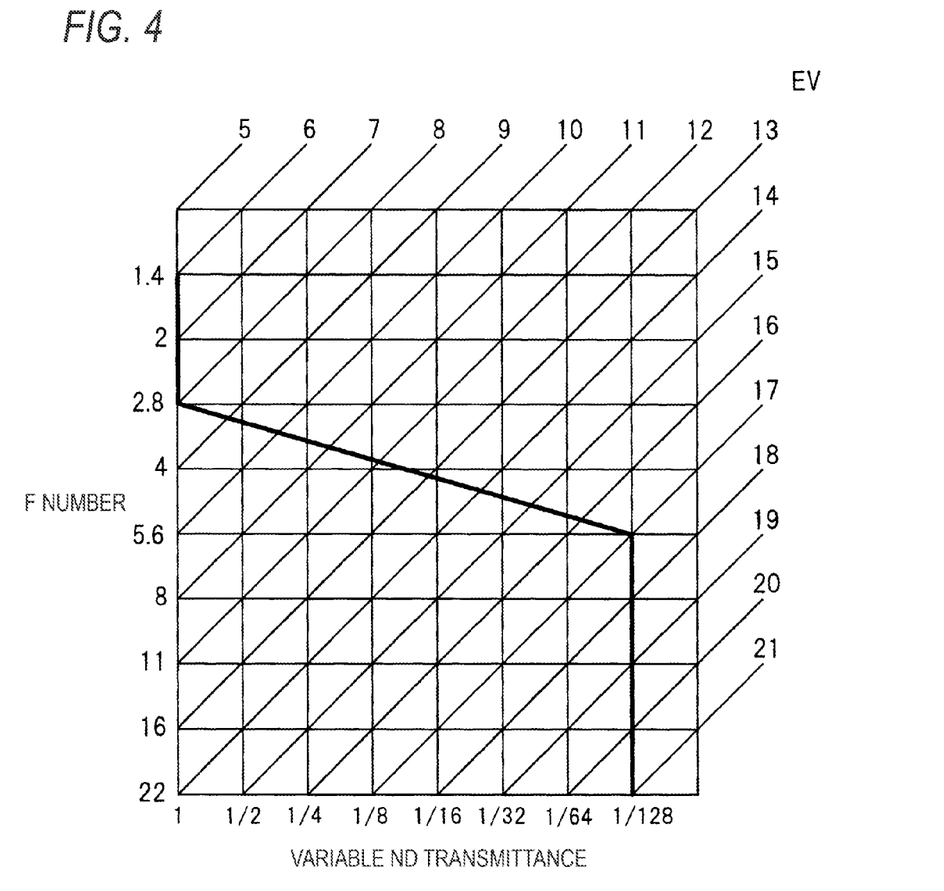
FIG. 4 is a view illustrating a modified embodiment of the program diagram.

For example, when the optimal range of the F number is designated as a range of F2.8 to F5.6, the exposure is controlled in accordance with the program diagram as illustrated in FIG. 4. A memory in which a program diagram is stored for every designated range of F number may be provided in the lens device 1.

Figure 5:
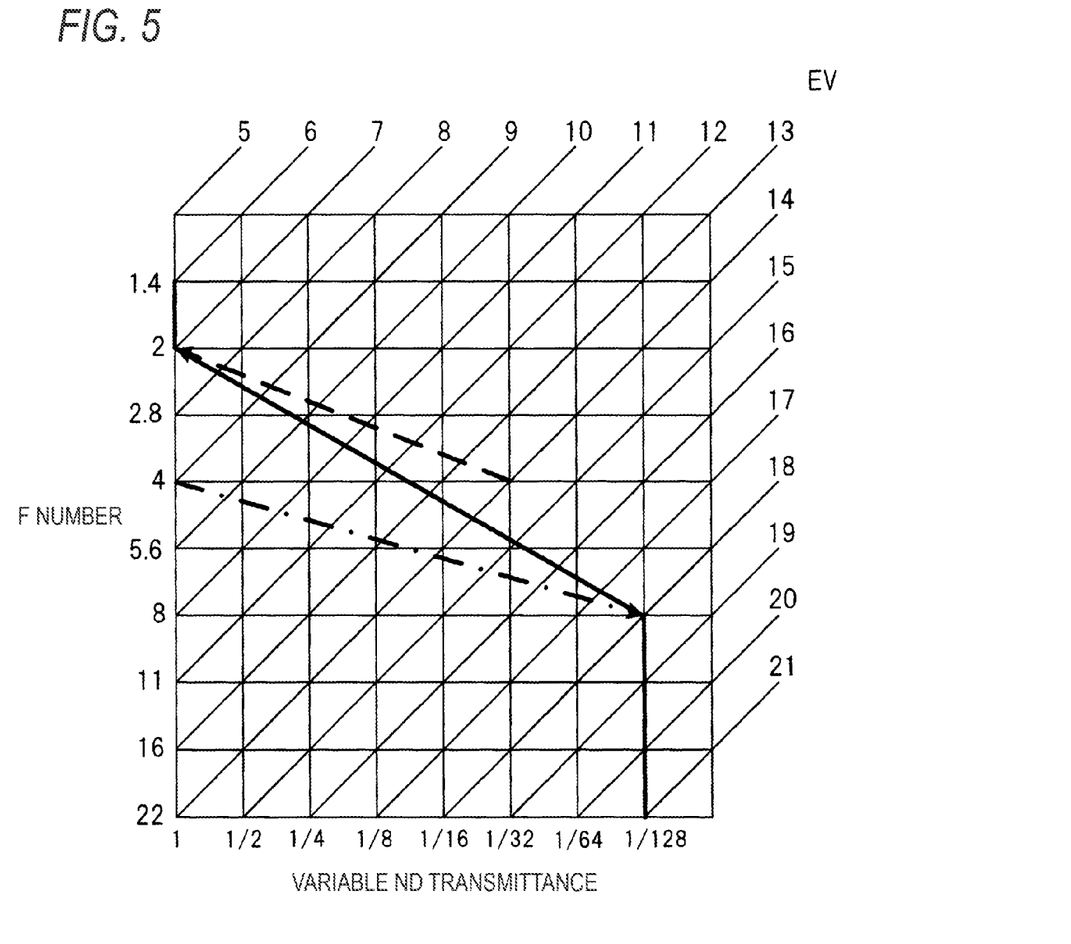
FIG. 5 is a view illustrating a modified embodiment of the program diagram.

In the program diagram of FIG. 2, it is assumed that a slope of a portion of the thick solid line which extends in a diagonal direction, a slope of the broken line arrow which diagonally extends to an upper left side, and a slope of the one-dot chain line arrow which diagonally extends to a lower right side are equal to each other, but the present invention is not limited thereto. For example, the slopes may be set as illustrated in FIG. 5. As illustrated in FIG. 2, when the slopes of the program diagrams at the time of changing the exposure by changing both the F number and the variable ND transmittance are set to be equal to each other, the control may be simply performed.

When the brightness of the photographic subject is changed to the bright direction from EV16 which is a combination of the F number of 4 and the variable ND transmittance of $1/128$, the variable ND transmittance may not be lowered any more. Therefore, both the diaphragm and the variable ND filter may not be simultaneously driven in step S2 of FIG. 3. Therefore, in this case, the exposure controlling unit 17 may control the exposure by changing only the F number. In the range of EV7 to EV18, both the F number and the variable ND transmittance may be simultaneously changed. A control for changing the F number while fixing the variable ND transmittance or a control for changing the variable ND transmittance while fixing the F number may be performed.

As described above, the specification discloses the following matters.

A disclosed lens device includes: a diaphragm having an aperture value which is controlled to control a transmitted light quantity; an optical element having a light transmittance which is electrically controlled; and an exposure controlling unit which controls the aperture value of the diaphragm and the transmittance of the optical element in accordance with a brightness of a photographic subject to perform an exposure control, in which the exposure controlling unit changes at least one of the aperture value and the transmittance to set an exposure value which is included in a range of exposure value from a first exposure value which is determined by a combination of a minimum value of the aperture value in a range of aperture value including an aperture value at which a maximum resolving power is obtained and a maximum value of the transmittance to a second exposure value which is determined by a combination of a maximum value of the aperture value in the range of aperture value and a minimum value of the transmittance, and when the aperture value at the exposure value is different from the aperture value at which the maximum resolving power is obtained and the transmittance at the exposure value is neither the minimum nor the maximum after setting the exposure value, the exposure controlling unit further performs a control to bring the aperture value at the exposure value close to the aperture value at which the maximum resolving power is obtained and change the transmittance at the exposure value so as to maintain the exposure value.

In the disclosed lens device, the range of aperture value may be a range which may be manually set.

In the disclosed lens device, the range of aperture value may be a fixed range which is set in advance.

A disclosed camera system, includes: the lens device; and a camera device which includes an image capturing element which receives light which passes through the lens device.

A disclosed exposure control method of a lens device which includes a diaphragm having an aperture value which is controlled to control a transmitted light quantity; an optical element having a light transmittance which is electrically controlled, the method includes: an exposure control step of controlling the aperture value of the diaphragm and the transmittance of the optical element in accordance with a brightness of a photographic subject to control exposure, in which the exposure controlling step, at least one of the aperture value and the transmittance is changed to set an exposure value which is included in a range of exposure value from a first exposure value which is determined by a combination of a minimum value of the aperture value in a range of aperture value including an aperture value at which a maximum resolving power is obtained and a maximum value of the transmittance to a second exposure value which is determined by a combination of a maximum value of the aperture value in the range of aperture value and a minimum value of the transmittance, and when the aperture value at the exposure value is different from the aperture value at which the maximum resolving power is obtained and the transmittance at the exposure value is neither the minimum nor the maximum after setting the exposure value, a control is further performed to bring the aperture value at the exposure value close to the aperture value at which the maximum resolving power is obtained and change the transmittance at the exposure value so as to maintain the exposure value.

INDUSTRIAL APPLICABILITY

A lens device according to the present invention, a camera system including the same, and an exposure control method may control the exposure so as to reduce deterioration of the resolving power of a lens.

Although the present invention has been described in detail with reference to the specific embodiments, it is obvious to a person skilled in the art that various changes or modifications may be made without departing from the spirit and the scope of the present invention.

The present application is based on Japanese Patent Application No. 2011-189790 filed on Aug. 31, 2011 the disclosure of which is incorporated herein by reference.

REFERENCE SIGNS LIST

1: Lens device
2: Camera device
12: Diaphragm
13: Variable ND filter
17: Exposure controlling unit

The invention claimed is:

1. A lens device comprising:
a diaphragm having an aperture value which is controlled to control a transmitted light quantity;
an optical element having a light transmittance which is electrically controlled; and
an exposure controlling unit which controls the aperture value of the diaphragm and the transmittance of the optical element in accordance with a brightness of a photographic subject to perform an exposure control,
wherein the exposure controlling unit changes at least one of the aperture value and the transmittance to set an exposure value which is included in a range of exposure value from a first exposure value which is determined by a combination of a minimum value of the aperture value in a range of aperture value including an aperture value at which a maximum resolving power is obtained and a maximum value of the transmittance to a second exposure value which is determined by a combination of a maximum value of the aperture value in the range of aperture value and a minimum value of the transmittance, and
when the aperture value at the exposure value is different from the aperture value at which the maximum resolving power is obtained and the transmittance at the exposure value is neither the minimum nor the maximum after setting the exposure value, the exposure controlling unit further performs a control to bring the aperture value at the exposure value close to the aperture value at which the maximum resolving power is obtained and change the transmittance at the exposure value so as to maintain the exposure value.

2. The lens device of claim 1, wherein the range of aperture value is a range which may be manually set.

3. The lens device of claim 1, wherein the range of aperture value is a fixed range which is set in advance.

4. A camera system, comprising:
the lens device of claim 1; and
a camera device which includes an image capturing element which receives light which passes through the lens device.

5. An exposure control method of a lens device which includes a diaphragm having an aperture value which is controlled to control a transmitted light quantity; an optical element having a light transmittance which is electrically controlled, the method comprising:
an exposure control step of controlling the aperture value of the diaphragm and the transmittance of the optical element in accordance with a brightness of a photographic subject to control exposure,
where in the exposure controlling step,
at least one of the aperture value and the transmittance is changed to set an exposure value which is included in a range of exposure value from a first exposure value which is determined by a combination of a minimum value of the aperture value in a range of aperture value including an aperture value at which a maximum resolving power is obtained and a maximum value of the transmittance to a second exposure value which is determined by a combination of a maximum value of the aperture value in the range of aperture value and a minimum value of the transmittance, and
when the aperture value at the exposure value is different from the aperture value at which the maximum resolving power is obtained and the transmittance at the exposure value is neither the minimum nor the maximum after setting the exposure value, a control is further performed to bring the aperture value at the exposure value close to the aperture value at which the maximum resolving power is obtained and change the transmittance at the exposure value so as to maintain the exposure value.

* * * * *